United States Patent Office 3,409,014
Patented Nov. 5, 1968

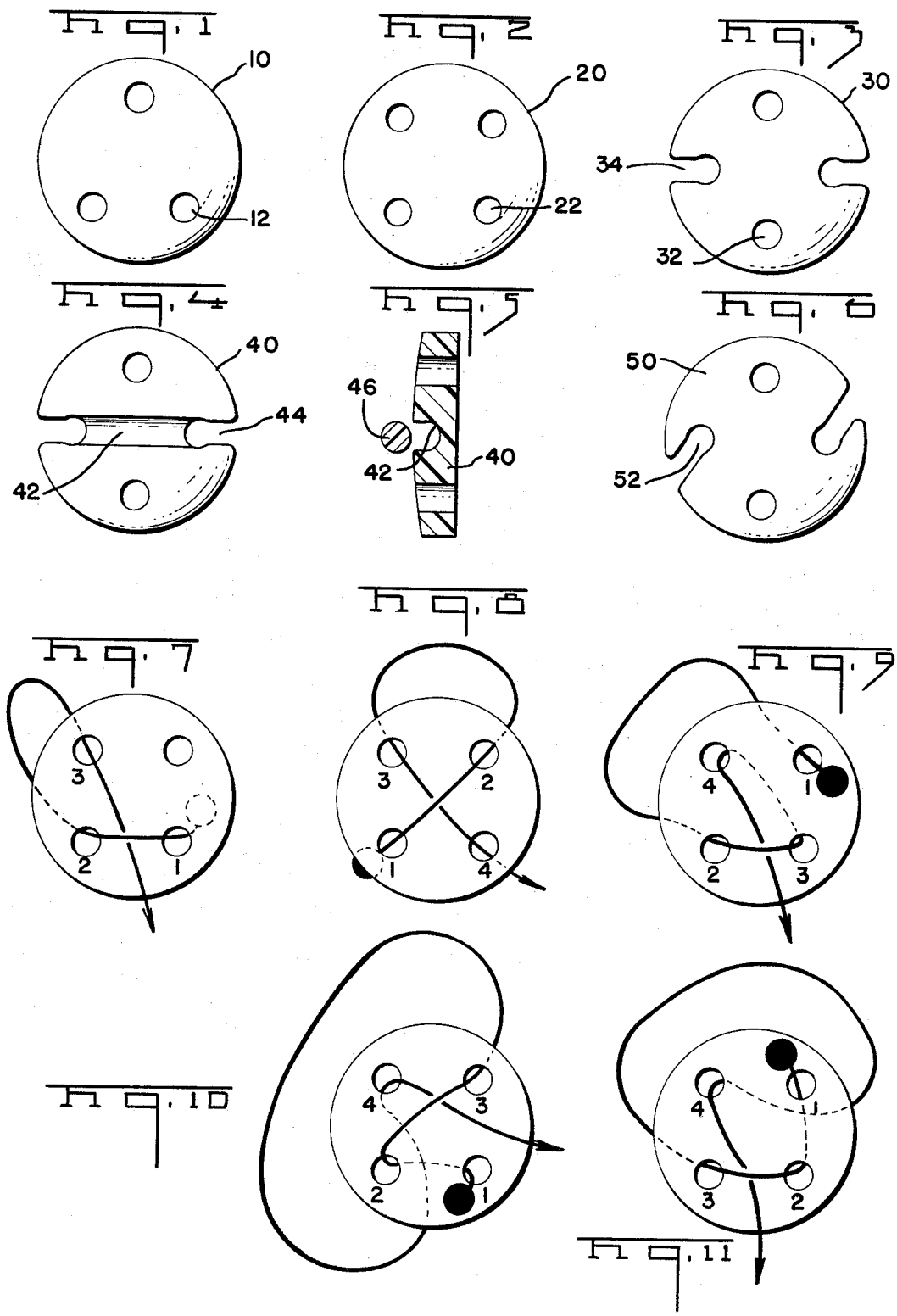

3,409,014
SURGICAL LIGATING DISK HAVING A NOOSE FORMING LIGATURE THREADED THERETHROUGH
Suel Grant Shannon, Harrisburg, Pa., assignor to AMP Incorporated, Harrisburg, Pa.
Filed Oct. 8, 1965, Ser. No. 494,103
11 Claims. (Cl. 128—326)

ABSTRACT OF THE DISCLOSURE

A ligator is provided consisting of a ligature loop and locking disk. The disk takes various configurations but is is designed to threadably receive a length of ligature in a manner to produce a one-way knot. The knot is of the type which becomes tighter as increased pressure is exerted on the ligature loop by an encircled blood vessel.

A typical surgical operation may involve an incision wherein a hundred or more blood vessels are severed, together with a greater number of small capillaries. The capillaries will normally cease bleeding rather quickly by the formation of a clot but the larger vessels will not seal themselves but, rather, must be ligated by some external means.

At present it is customary to seal the vessels by tying a strand of suture material around them. This is usually done by hand and is an extremely tedious and time consuming job. The suture material is normally cotton, silk, or catgut and the material is left on the vessels after the operation is completed, the material being absorbed in whole or in part by the body.

It is an object of the present invention to provide a ligature which is quicker to apply than other known ligating means whereby a considerable savings in time and labor will result.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purpose of illustration in order that others skilled in the art may fully understand the invention and the principles thereof and the manner of applying it in practical use so that they may modify it in various forms, each as may be best suited to the conditions of a particular use.

In the drawings, in which like reference numerals refer to like parts:

FIGURES 1–4 and 6 are various forms of a ligature made in accordance with the teachings of this invention.

FIGURE 5 is a cross-sectional view taken along the line 5—5 of FIGURE 4.

FIGURES 7–11 show various tying arrangements according to the present invention.

The present invention provides a lariat and honda arrangement with a running noose. The lariat and noose are formed from suture material while the honda comprises a button-like disk with a series of holes therein. FIGURE 1 shows a disk 10 having three holes 12 formed therein. The disk is preferably circular although a sqaure or triangular disk could be employed. Since the disks will remain in the body after the operation, the circular disc has the advantage of having no corners which might become irritating to the body.

FIGURE 2 shows a disk 20 having holes 22 therein, the disk being identical to disk 10 except there are four holes instead of three. As will become apparent, the number of holes needed is dependent on the particular suture material used.

The disk 30 of FIGURE 3 is similar to disk 20 except that two of the holes 32 have slots 34 connecting the holes with the periphery of the disk. This arrangement facilitates the threading of the disk since the suture material could be inserted through the slot rather than having to pass through the small hole, which hole is only slightly larger than the diameter of the suture material.

The disk 40 of FIGURE 4 is identical to disk 30 except that a channel 42 has been formed between the slotted holes 44. This groove could be used in conjunction with a locking bar 46 wherein the suture material lying across the groove 42 would be squeezed into the groove by the bar, the bar being pressed down by passing a length of suture through openings at opposite ends of the bar, all of which will become clearer during the discussion of the tying arrangement of FIGURE 8.

FIGURE 6 shows a disk 50 which is similar to disk 30 with the exception that the slots 52 are disposed at an angle to the radius to provide for the easy insertion of the suture material and also to reduce any possibility of the suture slipping out of the slots accidentally.

The disk may have their side surfaces parallel or alternatively one or both of the surfaces may be slightly spherical in shape. The spherical shape aids in insuring contact between the disk and the suture material in the event the suture material flattens considerably during application.

It is noted that the groove 42 of the disk of FIGURES 4 and 5 provides an interruption in the continuity of the surface of the disk, such interruption serving to further the non-slip characteristics of the disk. If desirable the groove could be replaced by a disk having a roughened or serrated surface whereby there would be a plurality of interruptions in the surface to prevent slip of the suture material and this latter configuration would not necessitate the use of any extra element such as bar 46.

The particular disk employed, together with a particular tying arrangement, wtih vary according to such variables as the type of material used for the disk, the diameter and surface characteristics of the particular suture material used, the method of applying the ligating device, the individual surgeon's preference, etc.

Having described the various desk configurations, the description of the tying arrangements will now proceed. For ease of illustration all of the tying arrangements have been shown in conjunction with the disk of FIGURE 2. The arrangement of FIGURE 7 utilizes three holes and, therefore either a three or four hole disk could be used. The three hole arrangement is preferred when the suture material is catgut. The arrangement is such that the material is knotted below the disk, passes up through hole 1, down through hole 2 into a noose, up through hole 3 and then under the previous loop, the arrow indicating the direction the material is pulled to tighten the noose around the vessel. When the noose is fully tightened the vessel and/or the skin surrounding the vessel will be constricted and will attempt to expand. This attempted expansion will maintain the 1–2 loop taut thus preventing the noose from becoming loose. Therefore, the disk can be seen to slide easily while the noose is being tightened but the disk cannot slide in the reverse direction.

Although the tying arrangement of FIGURE 7 works well with catgut, it is unsatisfactory for cotton or silk thread. This is because the catgut will retain its round cross-sectional shape under tying forces whereas the silk and cotton will tend to flatten out thus causing possible slippage. Therefore, a tying arrangement using each of the four holes of the disk is preferred for cotton and silk.

FIGURE 8 shows a tying arrangement suitable for cotton or silk thread and, because there are no sharp bend radii, can also be used with catgut. The arrangement is essentially the same as that of FIGURE 7 except that the strand, after passing under the 1–2 loop, is passed down through hole 4 to provide a tighter lock on the thread. This arrangement can utilize any of the disks of FIGURES 2–6. When the disk of FIGURES 4 and 5 is used the groove 42 would run between holes 1 and 2, and the bar would be threaded into the 1–2 loop whereby the noose, when tightened, would squeeze bar 46 into contact with groove 42 thus locking the 3–4 loop in place.

FIGURE 9 shows a further arrangement suitable for cotton or silk suture material. Because of the sharp bend radii this arrangement is not suitable for catgut. The thread is knotted above the disk and passes down through hole 1 into a noose, up through hole 2, down through hole 3, up through hole 4, and then under the 2–3 loop. Therefore, the lock is effected by the 2–3 loop pressing down on the 4-out length. This arrangement gives a better lock than that of FIGURE 8 because the sharp bend radii aid in resisting any reversing movement of the disk under tying forces.

The tying arrangements of FIGURES 10 and 11 differ from the previous arrangements in that two locking points are formed to further insure against any possible slippage under tying forces. In FIGURE 10 it can be seen that the 3–4 loop forms the noose and then passes under the 1–2 loop to form a first locking point and the 4-out length passes under the 2–3 loop to form a second locking point. The arrangement of FIGURE 11 utilizes the same two locking points as that shown in FIGURE 10. However, the FIGURE 11 arrangement is preferred because of a simpler threading arrangement. As can be seen in FIGURE 11, the threading sequence is such that the holes 1–2–3–4 are arranged consecutively, thus making the disk more readily adaptable to be automatically threaded by suitable mechanism.

It can be seen that various disks and tying arrangements have been shown and described which all have the feature of slipping easily into noose tightening position while being locked against any retrograde movement after the noose is fully tightened. The disks can be applied to the blood vessels in a fraction of the time required to hand tie each vessel thus permitting the surgeon to materially reduce the time which a patient must spend on the operating table.

The particular ligature used may vary and is not limited to the materials set forth above. The disk may be made from a suitable plastic material, preferably one which is readily absorbed by the body such as gelatin, and in some instances various suture material can be used to form the disk. The disks can be conveniently handled by molding them in strip form, thus easing the threading operation. It is to be understood that the disks are quite small in size. The holes in the disks are slightly larger than the cross-sectional size of the ligature and the remainder of the disk is made just large enough to provide sufficient strength so that the disk will not fracture during tying.

Throughout the specification and in the appended claims the term "disk" has been employed. This term is intended to be descriptive of any generally flat member, whether round, square, triangular, or other geometrical shape.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:
1. A ligating device comprising a disk, said disk having a pair of opposite sides and at least four apertures therein, a ligature threaded through the apertures in said disk, said ligature having an enlarged end incapable of passing through said apertures and a free end, the threading being such as to produce one loop on each said side of said disk and a noose, said noose terminating in portions passing between each of said loops and said disk whereby force exerted on said free end will constrict said noose while outward radial forces within said noose will cause each of said loops to lock the ligature against each of said opposite sides of said disk, thus preventing expansion of said noose.

2. In a ligating device as set forth in claim 1, said disk being formed of a material capable of being absorbed at least in part by the human body.

3. A surgical ligating device comprising a disk having a plurality of apertures therein, said disk being of a size to permit placement about a severed blood vessel, a surgical ligature threaded through said apertures, said apertures being of a size just sufficiently large to receive the said ligature therethrough, said ligature having a first end relatively fixed to said disk and having a second free end, a noose formed in said ligature and adapted to encircle a severed blood vessel, the threading of said ligature being such that a portion of said ligature between said noose and said free end passes between said disk and a portion of said ligature between said noose and said fixed end, whereby axial movement of said free end causes said noose to tighten around said vessel and whereby attempted expansion of said vessesl within said noose causes said ligature to be locked to said disk at the point of intersection of said portions of said ligature to thereby prevent the enlargement of said noose.

4. A ligating device comprising a disk having a plurality of apertures therein, a surgical ligature threaded through said apertures, said apertures being slightly larger than said ligature, said ligature having a first end relatively fixed to said disk and having a second free end, a noose formed in said ligature adapted to encircle a severed blood vessel, the threading of said ligature being such that a first portion of said ligature between said noose and said free end passes between said disk and a first portion of said ligature between said noose and said fixed end, and a second portion of said ligature between said noose and said free end passes between said disk and a second portion of said ligature between said noose and said fixed end, whereby axial movement of said free end causes said noose to tighten around said vessel and whereby attempted expansion of said vessel within said noose causes said ligature to be locked to said disk at the point of intersection of said portions of said ligature to thereby prevent the enlargement of said noose.

5. A surgical ligating device as set forth in claim 3 wherein said disk is formed of a material capable of being absorbed by the human body.

6. A surgical ligating device as set forth in claim 3 wherein said surgical ligature is formed of a material capable of being absorbed by the human body.

7. A device for ligating severed blood vessels during a surgical procedure, said device comprising a disk and length of surgical ligature, said disk having a pair of opposite sides and being of a size to permit placement about a severed blood vessel, said disk having a plurality of apertures therein of a size just sufficiently large to receive the said ligature therethrough, said ligature being threaded through said disk in a manner to produce a noose and a free end whereby force applied to said free end will cause constriction of said noose around a severed vessel, and means coacting with each of said opposite sides of said disk for preventing enlargement of said noose, said means being effective when said noose is in a constricted condition around a severed vessel.

8. A device for ligating severed blood vessels as set forth in claim 7 wherein said means comprises intersecting portions of said ligature.

9. A device for ligating severed blood vessels as set forth in claim 7 further comprising a fixed end on said ligature for fixing said ligature to said disk, and wherein said fixed end and said free end are disposed on the same side of said disk.

10. A device for ligating severed blood vessels as set forth in claim 7 wherein said disk is formed of a material capable of being absorbed by the human body.

11. A device for ligating severed blood vessels as set forth in claim 7 wherein said ligature is formed of a material capable of being absorbed by the human body.

References Cited

UNITED STATES PATENTS

| 122,135 | 12/1871 | Setchell et al. | 24—129 |
| 735,874 | 8/1903 | Herbert | 24—18 |
| 2,199,025 | 4/1940 | Conn | 128—335 |
| 2,947,051 | 8/1960 | Johnson | 24—129 |
| 3,056,408 | 10/1962 | Brown | 128—325 |

FOREIGN PATENTS

| 392,259 | 3/1924 | Germany. |
| 972,731 | 10/1964 | Great Britain. |

OTHER REFERENCES

Annals of Surgery, 1925, 82:452.

Plaut et al., Surgery, December 1964, vol. 56, No. 6, pp. 1078–79.

DALTON L. TRULUCK, *Primary Examiner.*